Jan. 15, 1935.  R. J. McNULTY  1,987,746
REGULATOR VALVE
Filed Dec. 5, 1932
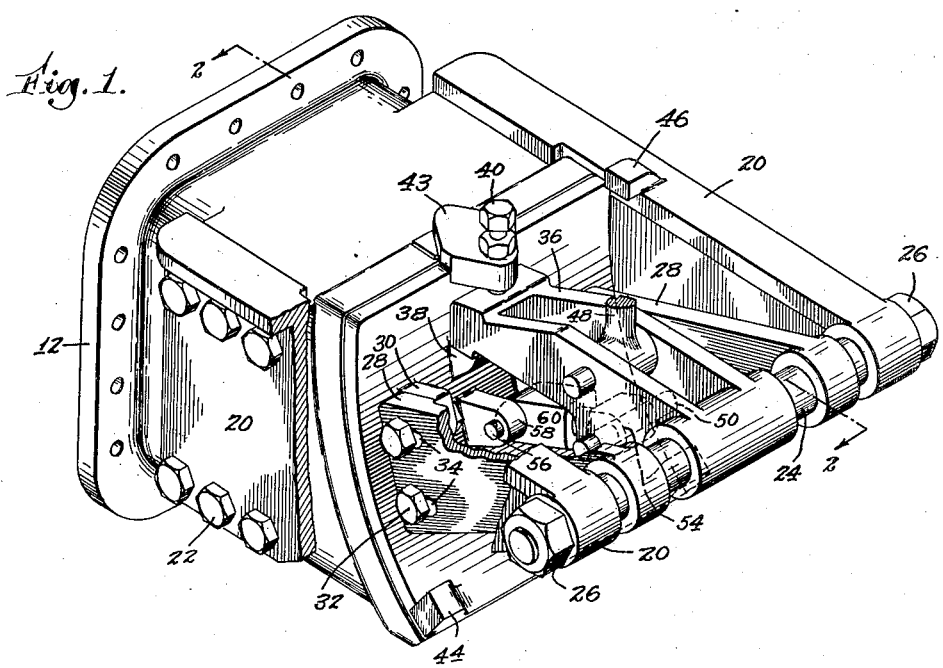
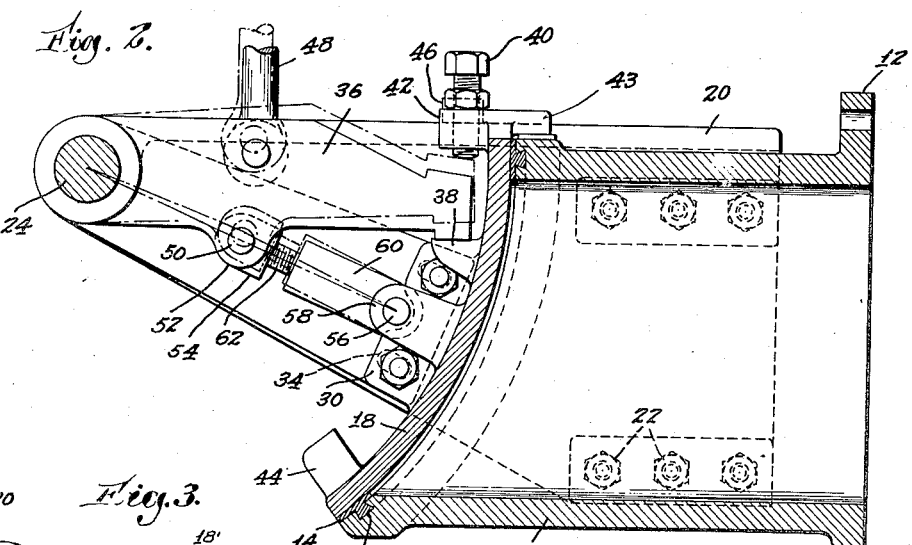
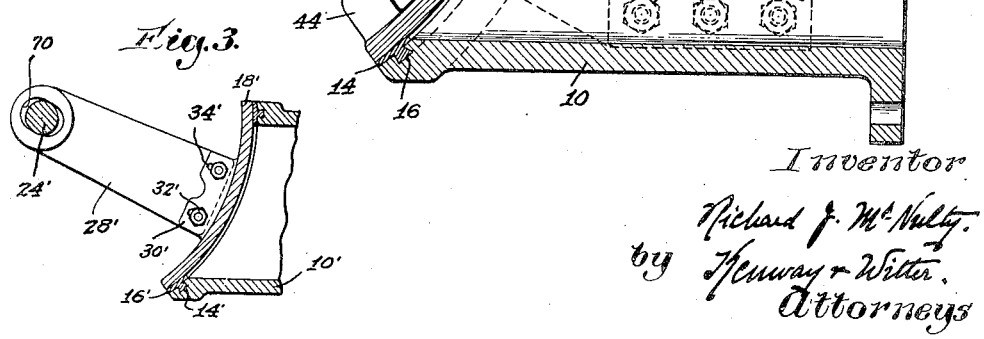

Patented Jan. 15, 1935

1,987,746

UNITED STATES PATENT OFFICE 1,987,746

REGULATOR VALVE

Richard J. McNulty, Dorchester, Mass., assignor to Albert P. McCulloch, Boston, Mass.

Application December 5, 1932, Serial No. 645,647

1 Claim. (Cl. 251—19)

This invention relates to regulator valves for use in sewer or water systems or in other pipe lines where it is desired automatically to control the flow. The invention comprises an improved shear valve includng a valve gate adapted to be freely and easily moved across its valve seat to open or closed position and to be pressed automatically into tight engagement with the seat when it has reached closed position, and automatically withdrawn therefrom or released when it is to be moved from that position, thus combining ease of operation with efficiency of closing in a relatively simple valve assembly.

Valves of this nature are commonly used in conduits of relatively large diameter, wherein very considerable hydraulic pressures are developed and wherein severe stresses are imposed upon the moving and supporting parts of the valve mechanism. Furthermore, these valves are usually operated automatically by floats and such operation requires that the parts shall move with the greatest possible freedom and ease, and also that the valve gate shall seat so securely as to perform its closing function efficiently without the necessity of excessive operating pressures. The construction of my improved valve, as herein described, is such as to meet all these requirements and serve the contemplated purpose in a wider field of use more efficiently than have valves heretofore known. The valve of my invention is, moreover, reliable in its action and substantially unaffected by débris in the affluent.

These and other features of the invention will be best understood and appreciated from the following description of a preferred embodiment thereof, selected for purposes of illustration and shown in the accompanying drawing, in which Fig. 1 is a perspective view of a valve embodying my invention, portions thereof being broken away better to disclose the inner mechanism;

Fig. 2 is a sectional view taken on line 2—2 of Fig. 1;

Fig. 3 is a fragmentary view showing a modified detail.

The valve of my invention is particularly adapted for use with large sewage pipes and high hydraulic heads and I shall, therefore, herein describe the same in connection with such use. This improved valve and its associated mechanism is adapted to be located in a manhole chamber having inlet and outlet passages. The pipe section 10 constitutes the inlet and the valve automatically controls the flow of sewage from this inlet generally in accordance with the sewage level maintained in an adjoining float chamber, although the manner of control is not important from the standpoint of the present invention.

The pipe section 10 is flanged at 12, whereby it may be attached to the terminal section of a sewage pipe line. The inner end of the pipe 10 is formed obliquely and arcuately, and a valve seat 14 is provided thereon by means of a heavy rubber or metal packing having a holding portion 16 seated in an undercut groove in the pipe end. A gate 18 of corresponding arcuate shape is adapted to cooperate with the seat 14.

The valve gate operating mechanism is mounted on a yoke-shaped frame comprising two side arms 20 secured to the sides of the pipe 10 by tap bolts 22 and a shaft 24 mounted in the free ends of the arms and secured in place by nuts 26 threaded to the ends of the shaft. The gate 18 is carried by a pair of links 28 mounted to swing on the shaft 24 and having their free ends connected to a pair of lugs 30 on the gate by bolts 32, the bolts extending through slots 34 in the links, whereby to permit a limited movement of the gate toward and from the seat 14 or radially with respect to the axis of the shaft 24.

The gate 18 is moved across the valve seat through the agency of a lever 36 mounted to pivot on the shaft 24 and having its free end extending to a position between a stop 38 on the gate and an adjustable stop screw 40 carried by a lug 42 on the gate. This pivotal movement of the lever is adapted to cause movement of the gate downwardly and upwardly to and between positions covering and uncovering the valve seat, it being understood that the gate is so relatively heavy as normally to move downward by virtue of its own weight. Downward movement of the gate is limited by a rearwardly-extending stop 43 on the lug 42 and upward movement thereof is limited by cooperating lugs 44 and 46 on the gate and arms 20 respectively. The intermediate portion of the lever 36 is bifurcated to receive an upwardly-extending connection rod 48 to which may be attached a float for moving the gate and controlling its position automatically.

The loose connection at 34 normally permits free movement of the gate without any binding action against the seat 14, and when the gate is in other than its fully closed position there is no necessity for having the gate contact closely against the seat. However, when the gate is brought to its fully closed position, it is desirable that it shall form a tight closure to the pipe 10, and to effect this function the gate must be brought into close contact with the seat. This movement of the gate and its resulting function are accomplished automatically through the following-described toggle mechanism between the lever 36 and the gate.

Mounted on the intermediate portion of a pin 50, supported at its ends by two lugs 52 depending from the lever 36, is one element 54 of a toggle arm or connection. Mounted on the intermediate portion of a pin 56, supported at its ends by two lugs 58 on the gate, is another element 60 of the toggle arm. These two elements are connected together by a third element in the nature of a screw 62, whereby the arm may be adjusted for length. The relative positions of the pins 50 and 56 are such that when the gate is in the fully closed position and the lever 36 is in contact with the lug 38, the axes of the pins are in a straight line coinciding with the axis of the shaft 24, thus placing the toggle in its straight position when the gate is fully closed. The screw 62 is so adjusted that in this position of the gate and toggle the gate is pressed firmly onto its seat 14. The lever 36 has an idle movement between the stops 38 and 40 and this movement upwardly, to the position shown in broken lines in Fig. 2, is adapted to break the toggle and thus release the pressure of the gate on the seat, thereby permitting free movement of the gate under the action of the lever 36.

The operation of the mechanism as above described is believed to be obvious. The gate is shown as fully closed in Fig. 2. Upward movement of the rod 48 and lever 36 moves the parts to the position shown in broken lines in Fig. 2 before any movement of the gate takes place. This initial movement serves to break the toggle to the broken line position (Fig. 2) and thereby relieve the pressure of the gate relative to the seat. Continued upward movement of the lever 36 causes it, through its contact with the stop 40, to open the gate upwardly across the seat in an arcuate path. Any downward movement of the lever will permit the gate to drop in a corresponding degree by gravity. When the gate comes to the fully closed position, wherein the stop 43 engages the pipe 10, further downward movement of the lever 36 will cause straightening the toggle and a resulting pressure forcing the gate tightly against the seat 14.

It will be understood that the loose connection between the links 28 and the gate 18 may be provided in various ways and in Fig. 3 I have illustrated another preferred manner of forming this connection. The links 28' are connected to the gate by bolts 32' extending through slots 34' as above described in connection with Figs. 1 and 2. The other ends of the links, however, are provided with elongated openings 70 for receiving the shaft 24. In using this construction, the gate is accurately adjusted to position by seating it tightly against the seat and the nuts on the bolts 32' are then tightened with the gate in this position. The gate is thereby adjusted to and securely held in accurate seating position and the loose connection necessary for cooperating with the toggle mechanism is obtained by means of the elongated opening 70.

Having thus described my invention, what I claim as new and desire to secure by Letters Patent is:

In a regulator valve or water gate, an arcuate valve seat, a valve gate cooperating therewith, means for guiding the gate for movement about the arcuate axis of the seat, a pair of stops on the gate, a gate-moving lever pivotally movable about said axis and extending to a position between the stops, and a toggle cooperating with the lever and gate and adapted to press the gate against the seat when the lever engages one stop and to release such pressure when the lever engages the other stop.

RICHARD J. McNULTY.